(12) United States Patent
Ando et al.

(10) Patent No.: US 12,247,961 B2
(45) Date of Patent: Mar. 11, 2025

(54) COLUMN ACCOMMODATION DEVICE AND LIQUID CHROMATOGRAPH

(71) Applicant: SHIMADZU CORPORATION, Kyoto (JP)

(72) Inventors: Shotaro Ando, Kyoto (JP); Takashi Inoue, Kyoto (JP); Tsutomu Watanabe, Kyoto (JP); Hiroyuki Minato, Kyoto (JP); Nobumitsu Fukushima, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 366 days.

(21) Appl. No.: 17/799,741

(22) PCT Filed: Feb. 27, 2020

(86) PCT No.: PCT/JP2020/008118
§ 371 (c)(1),
(2) Date: Aug. 15, 2022

(87) PCT Pub. No.: WO2021/171508
PCT Pub. Date: Sep. 2, 2021

(65) Prior Publication Data
US 2023/0349868 A1    Nov. 2, 2023

(51) Int. Cl.
*G01N 30/60* (2006.01)
*B01D 15/22* (2006.01)
(Continued)

(52) U.S. Cl.
CPC .............. *G01N 30/60* (2013.01); *B01D 15/22* (2013.01); *G01N 30/16* (2013.01); *G01N 30/32* (2013.01);
(Continued)

(58) Field of Classification Search
None
See application file for complete search history.

(56) References Cited

U.S. PATENT DOCUMENTS

| 6,149,872 A | 11/2000 | Mack et al. |
| 2005/0161377 A1* | 7/2005 | Fujimoto ........... C12N 15/1017 210/120 |

(Continued)

FOREIGN PATENT DOCUMENTS

| GB | 2490148 A * 10/2012 ............. F04B 13/00 |
| JP | H01155548 A * 6/1989 |

(Continued)

OTHER PUBLICATIONS

Office Action for correspnding Japanese Patent Application No. 2022-502732 issued Mar. 7, 2023, with English machine translation.

(Continued)

*Primary Examiner* — Herbert K Roberts
(74) *Attorney, Agent, or Firm* — Renner, Otto, Boisselle & Sklar, LLP (57) ABSTRACT

A column accommodation device (1) includes a housing in which a column accommodation space (4) is provided, and a chip column (6) having a plate-shape and having an internal flow path (40) filled with a separation medium (41) is accommodated in the column accommodation space (4). An outer surface of the chip column (6) is provided with openings (42) respectively communicating with both ends of the internal flow path. Inside of the column accommodation space (4) is provided with a guide (18) for guiding the chip column (6) to a predetermined position. The column accommodation device (1) includes a seal device (32) for connecting and releasing pipes (44) to and from the openings (42) of the chip column (6), and a controller (46) configured to perform operation control of the seal device (32), and the controller (46) is configured to fluidly connect the pipes (44)

(Continued)

with respect to the openings (42) of the chip column (6) when it is determined that the chip column (6) is arranged at the predetermined position.

11 Claims, 5 Drawing Sheets

(51) Int. Cl.
  *G01N 30/16* (2006.01)
  *G01N 30/32* (2006.01)
  *G01N 30/02* (2006.01)
(52) U.S. Cl.
  CPC . *G01N 2030/027* (2013.01); *G01N 2030/326* (2013.01)

(56) References Cited

U.S. PATENT DOCUMENTS

| | | | | |
|---|---|---|---|---|
| 2009/0253213 | A1* | 10/2009 | Kaneblei | G01N 30/95 422/400 |
| 2010/0150781 | A1* | 6/2010 | Ervin | G01N 35/08 422/67 |
| 2012/0024399 | A1* | 2/2012 | Prentice | G01N 30/7233 137/315.01 |
| 2013/0161244 | A1* | 6/2013 | Ishii | G01N 35/00 210/91 |
| 2015/0059450 | A1 | 3/2015 | Takahashi | |
| 2019/0353613 | A1* | 11/2019 | King | G16B 45/00 |

FOREIGN PATENT DOCUMENTS

| | | |
|---|---|---|
| JP | 10-148628 A | 6/1998 |
| JP | 11-515106 A | 12/1999 |
| JP | 2012-519858 A | 8/2012 |
| JP | 2015-45532 A | 3/2015 |
| JP | 2017-511874 A | 4/2017 |
| WO | 2017/017765 A1 | 2/2017 |

OTHER PUBLICATIONS

International Search Report for corresponding Application No. PCT/JP2020/008118, mailed Jul. 4, 2020.
Written Opinion for corresponding Application No. PCT/JP2020/008118, mailed Jul. 4, 2020 (English machine translation).

* cited by examiner

COLUMN ACCOMMODATION DEVICE AND LIQUID CHROMATOGRAPH

TECHNICAL FIELD

The present invention relates to a column accommodation device and a liquid chromatograph.

BACKGROUND ART

In the liquid chromatograph, since the temperature of the separation column has a large influence on the separation performance, it is common to arrange the separation column in a thermostatic bath called a column oven and adjust the temperature of the separation column to a desired temperature (See Patent Document 1). When the separation column is arranged in the column oven, a door of a housing of the column oven is usually opened, and a pipe is fixed using fitting at an inlet and an outlet of the separation column in the column oven.

PRIOR ART DOCUMENT

Patent Document

Patent Document 1: Japanese Patent Laid-open Publication No. 2015-45532

SUMMARY OF THE INVENTION

Problems to be Solved by the Invention

The replacement work of the separation column using the fitting is performed manually by the worker. However, since the skill of the pipe connection work varies depending on the worker, a dead volume may occur at the connection part between the separation column and the pipe and adversely affect the analysis result.

The present invention has been made in view of the above problem, and an object is to enable replacement work of a separation column to be easily performed and to improve reproducibility of liquid chromatography analysis.

Solutions to the Problems

A column accommodation device according to the present invention includes a housing in which a column accommodation space for accommodating a separation column for liquid chromatography analysis is provided. The separation column is a chip column having a plate-shape and having an internal flow path filled with a separation medium, and an outer surface of the chip column parallel to the internal flow path is provided with openings respectively communicating with both ends of the internal flow path, the column accommodation device includes pipes provided inside the column accommodation space and fluidly connected to the openings of the chip column, a guide provided inside the column accommodation space so as to guide the chip column to a predetermined position inside the column accommodation space, a seal device that moves end parts of the pipes to connect and release the pipe to and from the opening of the chip column arranged at the predetermined position, and a controller configured to perform operation control of the seal device, and the controller is configured to fluidly connect the pipes to the openings of the chip column when it is determined that the chip column is arranged at the predetermined position. An example of the column accommodation device is a column oven that adjusts the temperature of the separation column using a heater and a temperature sensor.

A liquid chromatograph according to the present invention includes: a liquid feeding pump for feeding a mobile phase; a sample injector that is fluidly connected downstream of the liquid feeding pump and configured to inject a sample into a mobile phase fed by the liquid feeding pump; a plate-shaped chip column that is fluidly connected downstream of the sample injector and is a separation column for separating a sample injected by the sample injector into components; a detector that is fluidly connected downstream of the chip column and detects each component separated in the chip column; and the column accommodation device described above that accommodates the chip column.

Effects of the Invention

According to the column accommodation device according to the present invention, it is configured that the pipes are automatically connected to the openings of the chip column by the seal device when it is determined that the chip column is arranged at a predetermined position in the column accommodation space, and therefore, when the separation column is replaced, it is not necessary to manually perform the work of connecting the pipes to the separation column, and the replacement work of the separation column becomes simple. As a result, the influence of the skill level of the worker is reduced, and the reproducibility of the analysis result of liquid chromatography is improved.

The conventional column accommodation device (for example, column oven) does not have a means for detecting whether or not a separation column is arranged in the column accommodation device, that is, whether or not the pipes is connected to the inlet and the outlet of the separation column, the liquid feeding pump is operated in a state where the outlet of the pipe from the liquid feeding pump is opened in the column accommodation device, and there is a possibility that liquid leakage occurs in the column accommodation device. On the other hand, the column accommodation device according to the present invention automatically determines that the chip column is arranged at a predetermined position, and therefore it is possible to easily detect whether or not the chip column is arranged in the column accommodation device, and it is possible to prevent the liquid feeding pump from being operated in a state where the outlet of the pipe from the liquid feeding pump is opened in the column accommodation device.

According to the liquid chromatograph of the present invention, the column accommodation device according to the present invention described above is used as the column accommodation device for accommodating the chip column, and therefore, when the separation column is replaced, it is not necessary to manually perform the work of connecting the pipes to the separation column, and the replacement work of the separation column becomes simple. As a result, the influence of the skill level of the worker is reduced, and the reproducibility of the analysis result of liquid chromatography is improved.

EMBODIMENT OF THE INVENTION

Examples of a column accommodation device and a liquid chromatograph according to the present invention will be described below with reference to the drawings.

Figure 1:
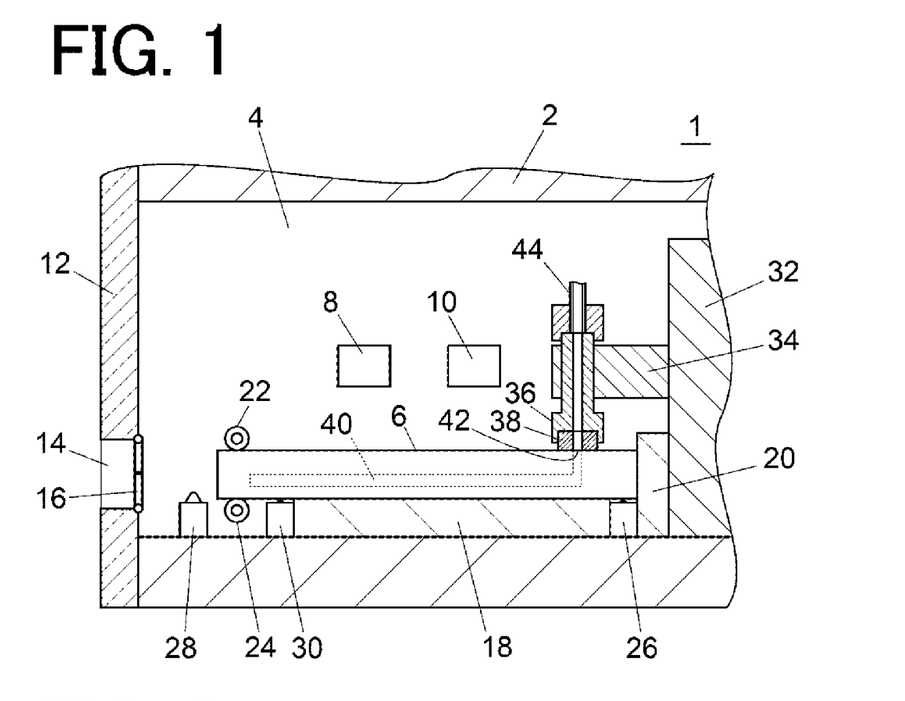
FIG. 1 is a schematic configuration cross-sectional view showing an example of a column accommodation device.

A column accommodation device 1 of this example is a column oven (hereinafter, referred to as column oven 1) that adjusts the temperature of a chip column 6 using a heater 8 and a temperature sensor 10. As shown in FIG. 1, the column oven 1 includes a column accommodation space 4 for housing the chip column 6 inside a housing 2. The chip column 6 forms a separation column for separating a sample into components in liquid chromatography. The temperature in the column accommodation space 4 is adjusted using the heater 8 and the temperature sensor 10. Although not shown in the drawing, a blower fan for equalizing the temperature in the column accommodation space 4 is also provided in the column accommodation space 4.

Figure 2:
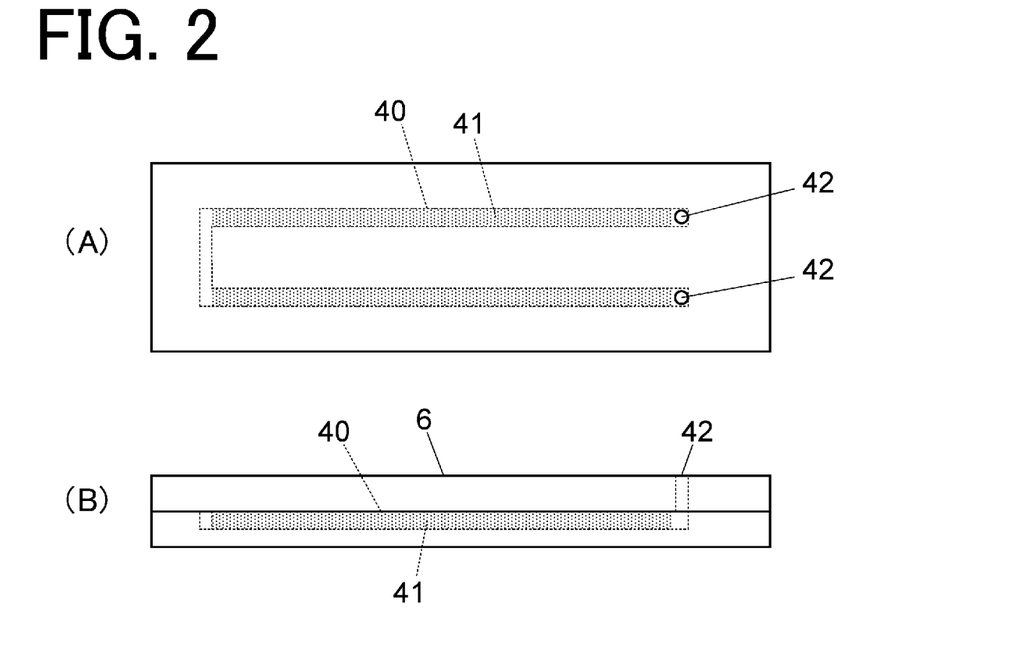
FIG. 2 is a view for explaining an example of a chip column used in the example, in which (A) is a plan view and (B) is a side view.

As shown in FIG. 2, the chip column 6 includes a U-shaped internal flow path 40, and one outer surface parallel to the internal flow path 40 is provided with two openings 42 leading to both ends of the internal flow path 40. Two sections of the internal flow path 40 parallel to each other are filled with a separation medium 41. One of the two openings 42 serves as an inlet of the separation column, and the other of the openings 42 serves as an outlet of the separation column. As shown in FIG. 2(B), the chip column 6 can be achieved by bonding a substrate having a U-shaped groove serving as the internal flow path 40 formed on the surface and a substrate provided with a through hole serving as the opening 42.

Returning to FIG. 1, the description of the column oven 1 will be continued. One side surface of the housing 2 of the column oven 1 is a door 12 that can be opened and closed manually by a user, and the user can access the column accommodation space 4 by opening the door 12. The door 12 is provided with an insertion port 14 for introducing and discharging the chip column 6 into and from the column accommodation space 4. In this example, the chip column 6 is designed on the premise that the chip column 6 is inserted substantially horizontally into the insertion port 14 with the outer surface provided with the openings 42 facing upward and the side provided with the openings 42 as a head. Hereinafter, among the outer surfaces of the chip column 6, the surface provided with the opening 42 is defined as an "upper surface", and the surface on the opposite side is defined as a "lower surface".

The insertion port 14 is opened and closed by an opening and closing cover 16. The opening and closing cover 16 is configured to maintain the insertion port 14 in a closed state except when the chip column 6 is introduced into the column accommodation space 4 and when the chip column 6 is discharged from the column accommodation space 4. The opening and closing cover 16 may be configured to be actively opened and closed by a motor, or may be configured to be passively opened by contact of the chip column 6 while being maintained in a closed state by a spring.

Although not shown in FIG. 1, the column oven 1 includes a lock mechanism 48 (see FIG. 3) that fixes the door 12 in a closed state and prevents the door 12 from being manually opened. The lock mechanism 48 can electrically control the operation, such as a solenoid lock.

The column accommodation space 4 is provided with a guide 18, a stopper 20, a roller 22, a roller 24, an arrangement detection sensor 26, an insertion detection sensor 28, a discharge detection sensor 30, and a seal device 32.

The guide 18 is for limiting the moving direction of the chip column 6 in the column accommodation space 4 to a uniaxial direction in a horizontal plane. FIG. 1 only shows a base portion supporting the lower surface of the chip column 6, but both side surfaces of the chip column 6 are also supported. The stopper 20 is positioned at the deepest position as viewed from the insertion port 14, and comes into contact with a tip end surface (right end surface in the figure) of the chip column 6 inserted from the insertion port 14 and advanced in the introduction direction (right side direction in the figure) to stop (position) the advance of the chip column 6 at a predetermined position.

The rollers 22 and 24 are arranged up and down in the vicinity of the insertion port 14 with an interval substantially equal to the thickness of the chip column 6, and are substantially simultaneously in contact with the upper surface and the lower surface of the chip column 6 inserted from the insertion port 14. At least any one of the rollers 22 and 24 is rotated by a roller driving motor 23 (see FIG. 3), and can apply a propulsive force in the introduction direction (right direction in the figure) to the chip column 6 held between the rollers. That is, the roller 22, the roller 24, and the roller driving motor 23 achieve a loading mechanism that applies a propulsive force in the introduction direction (right direction in the figure) to the chip column 6 inserted into the insertion port 14. This loading mechanism can also apply a propulsive force to the chip column 6 in a discharge direction (left direction in the figure) opposite to the introduction direction depending on the rotation direction of the roller driving motor 23.

In this example, the loading mechanism is achieved by rotating, by the motor, at least any one of the rollers 22 and 24 arranged up and down, but the present invention is not limited to this, and the loading mechanism can also be achieved by two rollers arranged separately from each other in the same horizontal plane so as to hold both side surfaces of the chip column 6 and a motor that rotates at least one of those rollers.

The arrangement detection sensor 26 is provided in the vicinity of the stopper 20, and detects the chip column 6 when the chip column 6 reaches the vicinity of a predetermined position. That is, the arrangement detection sensor 26 is a sensor for detecting that the chip column 6 is arranged at a predetermined position.

The insertion detection sensor 28 is provided at a position between the insertion port 14 and the roller 24, and detects the chip column 6 when the chip column 6 is inserted from the insertion port 14 by a certain distance. That is, the insertion detection sensor 28 is a sensor for detecting that the chip column 6 is inserted from the insertion port 14.

The discharge detection sensor 30 is provided at a position between the arrangement detection sensor 26 and the insertion detection sensor 28. The discharge detection sensor 30 is provided so as not to detect the chip column 6 when the chip column 6 is discharged from the insertion port 14 by a certain distance when the chip column 6 is discharged from the insertion port 14, whereby the discharge detection sensor 30 can detect that the chip column 6 is discharged.

The arrangement detection sensor 26, the insertion detection sensor 28, and the discharge detection sensor 30 can be achieved by general-purpose sensors such as microswitch and a photosensor. When the substrate constituting the chip column 6 is made of a light transmissive material, a reflective photosensor can be used as the arrangement detection sensor 26, the insertion detection sensor 28, and the discharge detection sensor 30 by providing a reflecting portion with a metal film or the like at a specific position of the chip column 6.

The seal device 32 is for connecting and releasing an inlet pipe and an outlet pipe (only one pipe 44 is shown in the figure) to and from each of the two openings 42 of the chip column 6. Here, a structure of the seal device 32 will be schematically described, but specifically, the structure as disclosed in Japanese Patent Laid-open Publication No. 2015-175781 may be used. The seal device 32 is configured to vertically move an arm 34 that supports a seal portion 36 having a lower end attached with a seal member 38. Inside of the seal portion 36 including the seal member 38 is provided with a flow path penetrating from the lower end to the upper end, and the upper end of the seal portion 36 is liquid-tightly attached with the end part of the pipe 44.

As shown in FIG. 1, the horizontal position of the hole of the lower end surface of the seal member 38 of the seal device 32 coincides with the horizontal position of the opening 42 of the chip column 6 arranged at a predetermined position in the column accommodation space 4. When the seal portion 36 is lowered so as to bring the seal member 38 into close contact with the upper surface of the chip column 6 in a state where the chip column 6 is arranged at a predetermined position, the flow path in the seal portion 36 is in fluid communication with the opening 42, whereby the pipe 44 is fluidly connected to the flow path 40.

Figure 3:
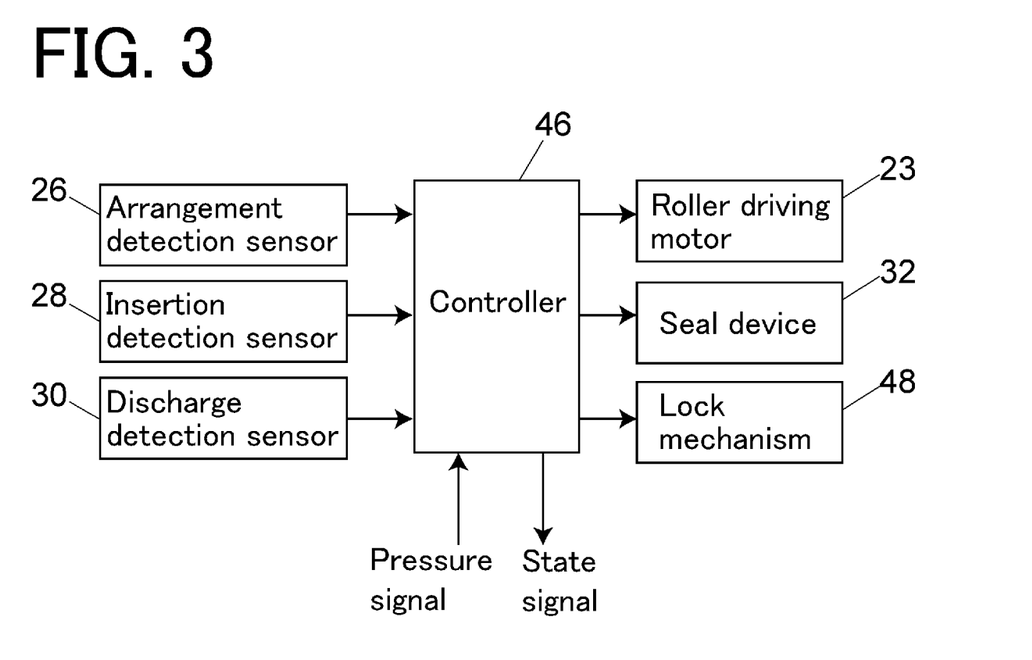
FIG. 3 is a block diagram showing a control system of the column accommodation device of the example.

FIG. 3 shows an example of the control system of the column oven 1.

The column oven 1 includes a controller 46. The controller 46 is achieved by a combination of an electric circuit including a central processing unit (CPU) and software. The controller 46 is configured to receive signals output from the arrangement detection sensor 26, the insertion detection sensor 28, and the discharge detection sensor 30, and to control the operations of the roller driving motor 23, the seal device 32, and the lock mechanism 48 based on these signals. Furthermore, the controller 46 is configured to receive a pressure signal from a pressure sensor that is connected to the opening 42 on the inlet side of the chip column 6 and detects the pressure in the inlet pipe 44 for introducing liquid into the flow path 40, and to control the operations of the roller driving motor 23 and the seal device 32 based on the pressure signal. The controller 46 is configured to output, as a state signal, information regarding whether or not the pipe 44 is connected to the opening 42 of the chip column 6.

An example of the operation of introducing the chip column 6 into the column oven 1 achieved by the controller 46 will be described using the flowchart of FIG. 4 together with FIGS. 1 and 3.

When the chip column 6 is inserted into the insertion port 14 in a state where the chip column 6 is not accommodated in the column accommodation space 4 (step 101), the insertion detection sensor 28 detects the chip column 6 (step 102). Based on a signal from the insertion detection sensor 28 indicating that the chip column 6 is inserted from the insertion port 14, the controller 46 applies a propulsive force in the introduction direction to the chip column 6 by operating the roller driving motor 23 (loading mechanism) (step 103). As a result, the chip column 6 advances in the introduction direction toward the stopper 20.

When the tip end of the chip column 6 reaches the vicinity of the stopper 20, the arrangement detection sensor 26 detects the chip column 6 (step 104). After receiving the signal from the arrangement detection sensor 26 indicating that the chip column 6 is arranged at the predetermined position, the controller 46 continues the operation of the roller driving motor 23 (loading mechanism) until a predetermined time further elapses (step 105), and causes the tip end surface of the chip column 6 to reliably reach the stopper 20. This makes the chip column 6 reliably arranged at a predetermined position in the column accommodation space 4.

Thereafter, the controller 46 stops the roller driving motor 23 (loading mechanism) (step 106), and connects the pipe 44 to the chip column 6 by causing the seal device 32 to lower the seal portion 36 to a predetermined height (step 107). This completes the introduction of the chip column 6 into the column oven 1.

Next, an example of the operation of discharging the chip column 6 from the column oven 1 achieved by the controller 46 will be described using the flowchart of FIG. 5 together with FIGS. 1 and 3.

The operation of discharging the chip column 6 from the column oven 1 is executed when a discharge instruction for requesting discharge of the chip column 6 from the column accommodation space 4 is input to the controller 46. The input of the discharge instruction to the controller 46 may be performed by the controller 46 receiving a signal generated when the user presses a predetermined button (that may be a virtual button displayed on a display panel) provided on the outer surface (for example, the door 12) of the column oven 1, or may be performed by the controller 46 receiving a signal of a discharge instruction output from a control device (a computer such as a personal computer) connected to the column oven 1.

When the discharge instruction is input to the controller 46 (step 201), the controller 46 compares, based on a signal from a pressure sensor (for example, a pressure sensor provided in the liquid feeding pump) that detects the pressure in the inlet pipe 44 connected to the opening 42 on the inlet side, the pressure in the inlet pipe 44 with a preset threshold (step 202), and when the pressure in the inlet pipe 44 is equal to or less than the threshold, causes the seal device 32 to raise the seal portion 36 to release the connection of the pipe 44 to the chip column 6 (step 203).

After releasing the connection of the pipe 44 to the chip column 6, the controller 46 operates the roller driving motor 23 (loading mechanism) in a direction opposite to the direction at the time of introduction of the chip column 6 to apply a propulsive force in the discharge direction to the chip column 6 (step 204). Due to this, the chip column 6 advances toward the insertion port 14.

When the chip column 6 continues to be caused to advance toward the insertion port 14, the discharge detection sensor 30 that has detected the chip column 6 no longer detects the chip column 6 (step 205). The controller 46 stops the roller driving motor 23 (loading mechanism) at the timing when the discharge detection sensor 30 no longer detects the chip column 6 or at the timing when a predetermined time has elapsed since the discharge detection sensor 30 no longer detects the chip column 6 (step 206). Due to this, the chip column 6 is stopped in a state where a part of the chip column 6 protrudes from the insertion port 14 to the outside of the door 12, and the chip column 6 is prevented from jumping out and falling from the insertion port 14. Thereafter, the user pulls out the chip column 6 to the outside of the column oven 1, whereby the discharge of the chip column 6 is completed.

When the seal device 32 pulls up the seal portion 36 while the inside of the inlet pipe 44 is in a high pressure state, the liquid in the inlet pipe 44 is ejected from the lower end of the seal portion 36 and scattered into the column accommodation space 4. Therefore, in the operation example of FIG. 5, even when the discharge instruction of the chip column 6 is input to the controller 46, when the pressure in the inlet pipe 44 exceeds a preset threshold, the connection of the pipe 44 to the chip column 6 is not released, and the connection of the pipe 44 to the chip column 6 is maintained until the pressure in the inlet pipe 44 becomes equal to or less than the threshold. As the threshold value, a value slightly higher than the atmospheric pressure can be set. In a case where the pressure in the inlet pipe 44 exceeds a preset threshold value when the discharge instruction for the chip column 6 is input to the controller 46, the discharge instruction may be invalidated. Whether or not the pressure in the inlet pipe 44 is equal to or less than the threshold can be determined based on whether or not a state in which the pressure in the inlet pipe 44 is equal to or less than the threshold by comparing with the pressure in the inlet pipe 44 with the threshold has continued for a predetermined time.

Figure 4:
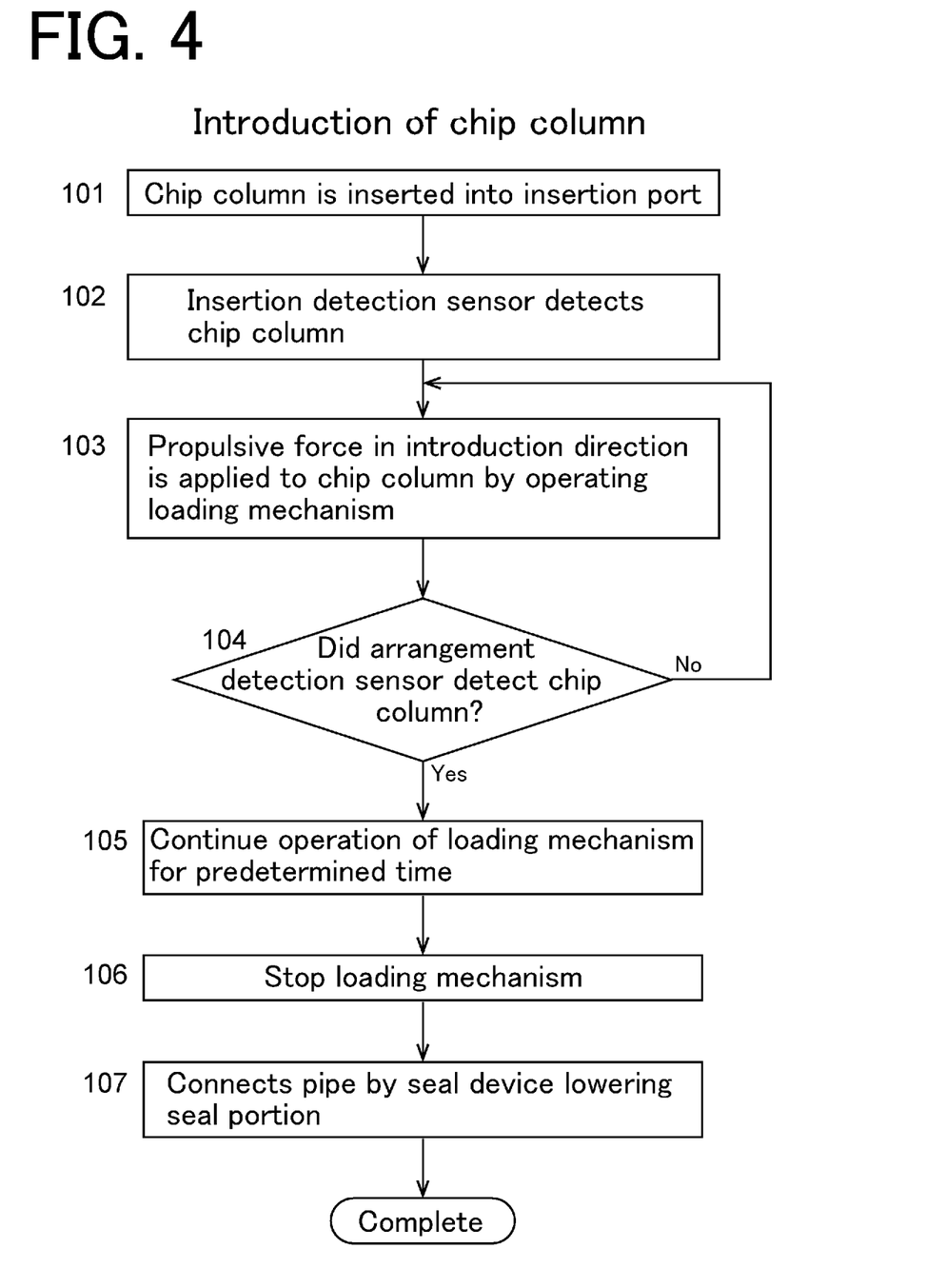
FIG. 4 is a flowchart for explaining an example of an operation when a chip column is introduced into the column accommodation device of the example.
Figure 5:
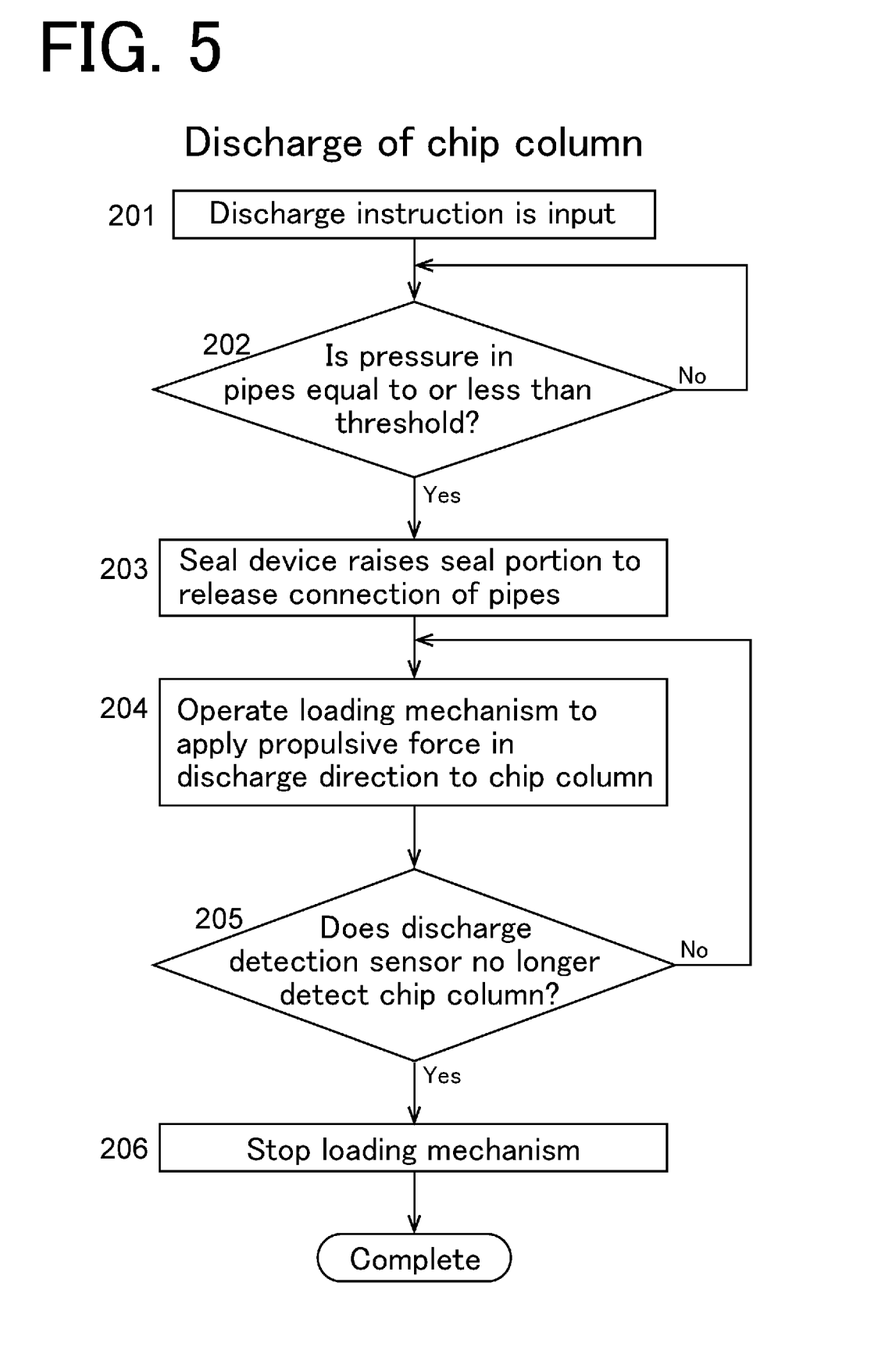
FIG. 5 is a flowchart for explaining an example of an operation when a chip column is discharged from the column accommodation device of the example.

Although not shown in FIGS. 4 and 5, the controller 46 may be configured to lock the door 12 by the lock mechanism 48 at least during the operation of the loading mechanism. This can prevent the door 12 from being opened during the operation of the loading mechanism, whereby the loading mechanism and the chip column 6 can be prevented from being damaged by the collision between the insertion port 14 and the chip column 6.

Figure 6:
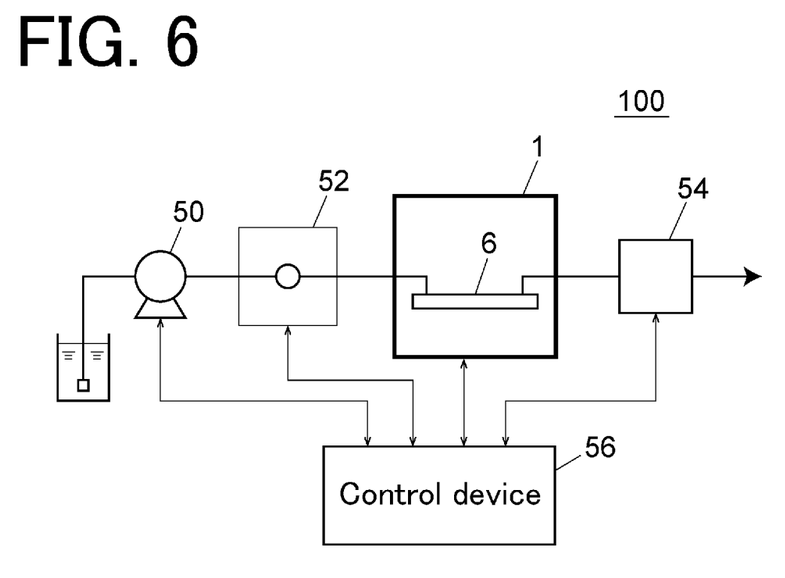
FIG. 6 is a schematic flow path configuration diagram showing an example of a liquid chromatograph.

Next, an example of a liquid chromatograph including the column oven 1 will be described with reference to FIG. 6.

A liquid chromatograph 100 includes a liquid feeding pump 50, a sample injector 52, a detector 54, and a control device 56 in addition to the column oven 1.

The liquid feeding pump 50 is for feeding a mobile phase. The sample injector 52 is fluidly connected to the downstream of the liquid feeding pump 50, and is configured to inject a sample into the mobile phase fed by the liquid feeding pump 50. The chip column 6 accommodated inside the column oven 1 is fluidly connected to downstream of the sample injector 52, and the sample injected into the mobile phase by the sample injector 52 is separated for each component in the internal flow path 40 (see FIG. 1 and the like) of the chip column 6. The detector 54 is connected downstream of the chip column 6, and each component separated in the chip column 6 is detected by the detector 54.

The control device 56 is configured to perform operation management of the entire system of the liquid chromatograph 100 by performing mutual communication among the liquid feeding pump 50, the sample injector 52, the column oven 1, and the detector 54. The control device 56 may be achieved by a dedicated computer such as a system controller, or may be achieved by a general-purpose personal computer in which dedicated software is installed.

The liquid feeding pump 50 includes a pressure sensor for detecting a liquid feeding pressure, and a pressure signal from the pressure sensor is input to the column oven 1 via the control device 56. In the column oven 1, the pressure in the inlet pipe 44 connected to the inlet side of the chip column 6 is monitored based on the pressure signal input via the control device 56, and the pressure value and a threshold value are compared to determine whether or not the pipe 44 can be released from the chip column 6 during the discharge operation of the chip column 6.

In the column oven 1, the connection state of the pipe 44 with respect to the chip column 6 can be easily grasped by the operating state of the seal device 32 and the like. The column oven 1 outputs, to the control device 56, a state signal related to whether or not the pipe 44 is connected to the chip column 6. Therefore, the control device 56 can monitor whether or not the pipe 44 is connected to the chip column 6, and can prevent liquid feeding by the liquid feeding pump 50 from being started in a state where the pipe 44 is not connected to the chip column 6.

The examples described above are merely examples of an embodiment of the column accommodation device and the liquid chromatograph according to the present invention. Embodiments of the column accommodation device and the liquid chromatograph according to the present invention are as follows.

An embodiment of a column accommodation device according to the present invention is a column accommodation device including a housing in which a column accommodation space for accommodating a separation column for liquid chromatography analysis is provided, in which the separation column is a chip column having a plate-shape and having an internal flow path filled with a separation medium, and an outer surface of the chip column parallel to the internal flow path is provided with openings respectively communicating with both ends of the internal flow path, the column accommodation device includes pipes provided inside the column accommodation space and fluidly connected to the openings of the chip column, a guide provided inside the column accommodation space so as to guide the chip column to a predetermined position inside the column accommodation space, a seal device that moves end parts of the pipes to connect and release the pipes to and from the openings of the chip column arranged at the predetermined position, and a controller configured to perform operation control of the seal device, and the controller is configured to fluidly connect the pipes to the openings of the chip column when it is determined that the chip column is arranged at the predetermined position.

In a first aspect of the above embodiment of the column oven according to the present invention, the housing is provided with an insertion port for inserting the chip column from outside of the housing into the column accommodation space, and inside of the column accommodation space is provided with a loading mechanism that comes into contact with the chip column inserted into the column accommodation space via the insertion port and applies a propulsive force in an introduction direction toward the predetermined position. According to such an aspect, by simply inserting the chip column into the insertion port by the user, the chip column is automatically arranged at a predetermined position in the column accommodation space, and the pipes are automatically connected to the chip column, and therefore work of introducing the chip column into the column accommodation device becomes simple.

In a specific example [1] of the first aspect, an arrangement detection sensor for detecting that the chip column is arranged at the predetermined position when the chip column is guided to the predetermined position by the guide, and a stopper for positioning the chip column at the predetermined position by coming into contact with the chip column when the chip column is guided to the predetermined position by the guide are further included, the controller is configured to control an operation of the loading mechanism so that the loading mechanism applies a propulsive force in the introduction direction to the chip column for a certain time after receiving a signal from the arrangement detection sensor indicating that the chip column is arranged at the predetermined position. This can reliably arrange the chip column at the predetermined position, and can enhance accuracy of connection of the pipes to the openings of the chip column.

In a specific example [2] of the first aspect, an insertion detection sensor for detecting that the chip column is inserted from the insertion port is provided in the vicinity of the insertion port in the column accommodation space, and the controller is configured to control the operation of the loading mechanism so as to start the operation of the loading mechanism based on a signal from the insertion detection sensor indicating that the chip column is inserted from the insertion port. This can easily determine the timing of starting the operation of the loading mechanism.

In a specific example [3] of the first aspect, the loading mechanism may apply, to the chip column, the propulsive force in the introduction direction and a propulsive force in a discharge direction opposite to the introduction direction. This can automate not only introduction of the chip column into the column oven but also discharge of the chip column from the column accommodation device.

In the specific example [3], the loading mechanism can include a roller that rotates while being in contact with an outer surface of the chip column, and a motor that rotates the roller.

In the specific example [3], the controller can be configured, when a discharge instruction for requesting discharge of the chip column arranged at the predetermined position from the column accommodation space is input, to control the operations of the seal device and the loading mechanism so as to release connection of the pipes with respect to the openings of the chip column, and move the chip column in the discharge direction. This achieves automation of the operation of discharging the chip column from the column accommodation device.

In the above case, the controller can be configured to prohibit releasing of, and maintain, connection of the pipes with respect to the openings of the chip column in a state where pressure in an inlet pipe exceeds a preset threshold based on a pressure signal from a pressure sensor that detects pressure in a inlet pipe, which is one of the pipes, for introducing liquid into the internal flow path. This prevents connection of the pipes with respect to the chip column from being released in a high pressure state in the inlet pipe, and as a result, it is possible to prevent liquid from being ejected from the inlet pipe.

In the specific example [3], the housing can include a door and a lock mechanism for fixing the door in a closed state to prevent manual opening, and the insertion port can be provided in the door. In this case, the controller can be configured to control operation of the lock mechanism so as to prevent the door from being manually opened by the lock mechanism during operation of the loading mechanism. This can prevent the door from being opened during operation of the loading mechanism, whereby the loading mechanism and the chip column can be prevented from being damaged by the collision between the insertion port and the chip column.

In a second aspect of the above embodiment of the column accommodation device according to the present invention, the controller is configured to output a state signal indicating a connection state of the pipes with respect to the openings of the chip column. According to such an aspect, the control device or the user who manages a liquid chromatograph system can easily recognize the connection state of the pipes with respect to the openings of the chip column, and it is possible to prevent occurrence of an accident such as starting liquid feeding by a liquid feeding pump in a state where the pipes are not connected to the chip column.

In a third aspect of the above embodiment of the column accommodation device according to the present invention, the column accommodation device further includes an arrangement detection sensor for detecting that the chip column is arranged at the predetermined position when the chip column is guided to the predetermined position by the guide, and the controller is configured to fluidly connect the pipes with respect to the openings of the chip column based on a signal from the arrangement detection sensor indicating that the chip column is arranged at the predetermined position. According to such an aspect, fluid connection of the pipes with respect to the openings is performed after it is detected that the chip column is arranged at the predetermined position, and therefore accuracy of connection of the pipes with respect to the chip column is improved.

An embodiment of a liquid chromatograph according to the present invention includes:
 a liquid feeding pump for feeding a mobile phase;
 a sample injector that is fluidly connected downstream of the liquid feeding pump and configured to inject a sample into a mobile phase fed by the liquid feeding pump;
 a plate-shaped chip column that is fluidly connected downstream of the sample injector and is a separation column for separating a sample injected by the sample injector into components;
 a detector that is fluidly connected downstream of the chip column and detects each component separated in the chip column; and
 the column accommodation device described above that accommodates the chip column.

In the above embodiment, a control device configured to perform operation control of the liquid feeding pump may be included, and the column accommodation device may be configured to output a state signal indicating a connection state of a pipe with respect to the chip column. In this case, the control device can be configured to operate the liquid feeding pump only when pipes are connected to the chip column based on the state signal output from the column accommodation device. This makes it possible to prevent a situation in which liquid feeding by the liquid feeding pump is started in a state in which the pipes are not connected to the chip column.

DESCRIPTION OF REFERENCE SIGNS

1: Column oven (Column accommodation device)
2: Housing
4: Column accommodation space
6: Chip column
8: Heater
10: Temperature sensor
12: Door
14: Insertion port
16: Opening and closing cover
18: Guide 20: Stopper
22, 24: Roller
23: Roller driving motor
26: Arrangement detection sensor
28: Insertion detection sensor
30: Discharge detection sensor
32: Seal device
34: Arm
36: Seal portion
38: Seal member
40: Internal flow path
41: Separation medium
42: Opening
44: Pipe
46: Controller
48: Lock mechanism
50: Liquid feeding pump
52: Sample injector
54: Detector
56: Control device

The invention claimed is:

1. A column accommodation device including a housing in which a column accommodation space for accommodating a separation column for liquid chromatography analysis is provided, wherein
the separation column is a chip column having a plate-shape and having an internal flow path filled with a separation medium, and an outer surface of the chip column parallel to the internal flow path is provided with openings respectively communicating with both ends of the internal flow path,
the column accommodation device includes
pipes provided inside the column accommodation space and fluidly connected to the openings of the chip column,
a guide provided inside the column accommodation space so as to guide the chip column to a predetermined position inside the column accommodation space,
a seal device that moves end parts of the pipes to connect and release the pipes to and from the openings of the chip column arranged at the predetermined position,
a controller configured to perform operation control of the seal device,
wherein the controller is configured to fluidly connect the pipes to the openings of the chip column when it is determined that the chip column is arranged at the predetermined position;
wherein the housing is provided with an insertion port for inserting the chip column from outside of the housing into the column accommodation space, and
wherein inside of the column accommodation space is provided with a loading mechanism that comes into contact with the chip column inserted into the column accommodation space via the insertion port and applies a propulsive force in an introduction direction toward the predetermined position
an arrangement detection sensor for detecting that the chip column is arranged at the predetermined position when the chip column is guided to the predetermined position by the guide; and
a stopper for positioning the chip column at the predetermined position by coming into contact with the chip column when the chip column is guided to the predetermined position by the guide,
wherein the controller is further configured to control an operation of the loading mechanism so that the loading mechanism applies a propulsive force in the introduction direction to the chip column for a certain time after receiving a signal from the arrangement detection sensor indicating that the chip column is arranged at the predetermined position.

2. The column accommodation device according to claim 1 comprising an insertion detection sensor for detecting that the chip column is inserted from the insertion port in a vicinity of the insertion port in the column accommodation space,
wherein the controller is configured to control an operation of the loading mechanism so as to start the operation of the loading mechanism based on a signal from the insertion detection sensor indicating that the chip column is inserted from the insertion port.

3. The column accommodation device according to claim 1, wherein the loading mechanism may apply, to the chip column, the propulsive force in the introduction direction and a propulsive force in a discharge direction opposite to the introduction direction.

4. The column accommodation device according to claim 3, wherein the loading mechanism includes a roller that rotates while being in contact with an outer surface of the chip column, and a motor that rotates the roller.

5. The column accommodation device according to claim 3, wherein the controller is configured, when a discharge instruction for requesting discharge of the chip column arranged at the predetermined position from the column accommodation space is input, to control operations of the seal device and the loading mechanism so as to release connection of the pipes with respect to the openings of the chip column and move the chip column in the discharge direction.

6. The column accommodation device according to claim 1, wherein the controller is configured to prohibit releasing of, and maintain, connection of the pipes with respect to the openings of the chip column in a state where pressure in an inlet pipe exceeds a preset threshold based on a pressure signal from a pressure sensor that detects pressure in the inlet pipe, which is one of the pipes, for introducing liquid into the internal flow path.

7. The column accommodation device according to claim 3, wherein
the housing includes a door and a lock mechanism for fixing the door in a closed state to prevent manual opening,
the insertion port is provided in the door, and
the controller is configured to control operation of the lock mechanism so as to prevent the door from being manually opened by the lock mechanism during operation of the loading mechanism.

8. The column accommodation device according to claim 1, wherein the controller is configured to output a state signal indicating a connection state of the pipes with respect to the openings of the chip column.

9. The column accommodation device according to claim 1 further comprising an arrangement detection sensor for detecting that the chip column is arranged at the predetermined position when the chip column is guided to the predetermined position by the guide,
wherein the controller is configured to fluidly connect the pipes with respect to the openings of the chip column based on a signal from the arrangement detection sensor indicating that the chip column is arranged at the predetermined position.

10. A liquid chromatograph comprising:
a liquid feeding pump for feeding a mobile phase;
a sample injector that is fluidly connected downstream of the liquid feeding pump and configured to inject a sample into a mobile phase fed by the liquid feeding pump;
a plate-shaped chip column that is fluidly connected downstream of the sample injector and is a separation column for separating a sample injected by the sample injector into components;
a detector that is fluidly connected downstream of the chip column and detects each component separated in the chip column; and
the column accommodation device according to claim 1 that accommodates the chip column.

11. The liquid chromatograph according to claim 10 comprising a control device configured to perform operation control of the liquid feeding pump,
wherein the column accommodation device is configured to output a state signal indicating a connection state of pipes with respect to the chip column, and
the control device is configured to operate the liquid feeding pump only when the pipes are connected to the chip column based on the state signal output from the column accommodation device.

* * * * *